United States Patent
Sugihara (10) Patent No.: US 9,635,198 B2
(45) Date of Patent: Apr. 25, 2017

(54) DISCONNECTION TIME ACQUISITION SYSTEM THAT RECORDS DISCONNECTION TIME AT WHICH POWER SUPPLY IS DISCONNECTED IN LOG, IMAGE PROCESSING SYSTEM, AND DISCONNECTION TIME ACQUISITION METHOD

(71) Applicant: Kyocera Document Solutions Inc., Osaka (JP)

(72) Inventor: Tomoyoshi Sugihara, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 15/052,905

(22) Filed: Feb. 25, 2016

(65) Prior Publication Data

US 2016/0248923 A1 Aug. 25, 2016

(30) Foreign Application Priority Data

Feb. 25, 2015 (JP) .................................. 2015-035453

(51) Int. Cl.
*H04N 1/04* (2006.01)
*H04N 1/00* (2006.01)
*G06F 3/12* (2006.01)

(52) U.S. Cl.
CPC ....... *H04N 1/00244* (2013.01); *G06F 3/1204* (2013.01); *G06F 3/1273* (2013.01); *H04N 1/00411* (2013.01); *H04N 1/00891* (2013.01); *H04N 2201/0094* (2013.01)

(58) Field of Classification Search
CPC ........... H04N 1/00244; H04N 1/00411; H04N 1/00891; H04N 2201/0094
USPC ......................................... 358/1.15, 1.9, 1.14
See application file for complete search history.

(56) References Cited

U.S. PATENT DOCUMENTS

| | | | |
|---|---|---|---|
| 6,493,104 B1* | 12/2002 | Cromer | G06F 3/1204 358/1.15 |
| 2014/0055800 A1* | 2/2014 | Matsumoto | G06F 3/1211 358/1.13 |

FOREIGN PATENT DOCUMENTS

| | | |
|---|---|---|
| JP | H08-156277 A | 6/1996 |
| JP | H11-143665 A | 5/1999 |
| JP | 2000-025306 A | 1/2000 |
| JP | 2000-099429 A | 4/2000 |
| JP | 2003-156580 A | 5/2003 |
| JP | 2004-127630 A | 4/2004 |

(Continued)

*Primary Examiner* — Houshang Safaipour
(74) *Attorney, Agent, or Firm* — James Judge (57) ABSTRACT

A disconnection time acquisition system includes a response requesting circuit, a response determining circuit, a response circuit, a time storage circuit, and a time management circuit. The response determining circuit, in a network server, determines whether or not a response signal in response to a response request signal is received. The response circuit, in an electronic device, replies the response signal in response to the response request signal to the network server. The time storage circuit, in the network server, stores a time without the response signal when the response signal in response to the response request signal is not received. The time management circuit manages the time without the response signal as a disconnection time at which a power supply of the electronic device is disconnected when the power supply of the electronic device is turned on.

4 Claims, 6 Drawing Sheets

(56) References Cited

FOREIGN PATENT DOCUMENTS

| JP | 2004-188793 A | 7/2004 |
| JP | 2005-262817 A | 9/2005 |
| JP | 2006-041739 A | 2/2006 |
| JP | 2015-014904 A | 1/2015 |

* cited by examiner

| Identification Information on Electronic Device | Time without Response |
|---|---|
| AAA | 1/27 9:00 |
| BBB | 1/28 9:00 |
| CCC | 1/30 9:00 |
| ... | ... |

DISCONNECTION TIME ACQUISITION SYSTEM THAT RECORDS DISCONNECTION TIME AT WHICH POWER SUPPLY IS DISCONNECTED IN LOG, IMAGE PROCESSING SYSTEM, AND DISCONNECTION TIME ACQUISITION METHOD

INCORPORATION BY REFERENCE

This application is based upon, and claims the benefit of priority from, corresponding Japanese Patent Application No. 2015-035453 filed in the Japan Patent Office on Feb. 25, 2015, the entire contents of which are incorporated herein by reference.

BACKGROUND

Unless otherwise indicated herein, the description in this section is not prior art to the claims in this application and is not admitted to be prior art by inclusion in this section.

An electronic device such as an image processing apparatus stores a time of every operation as a log for security. For example, one proposed image processing apparatus acquires the standard time when a power supply is turned on after an installation or a movement of a main body or after an instantaneous blackout, and then enables a built-in clock to automatically set time information.

Another proposed technique substitutes a time regarding a printer for a time of a clock in a management server connected to this printer, and yet another printer predicts a time at which a remaining amount of consumable such as a toner is used up based on a time of every operation held by using absolute time information from a clock unit.

SUMMARY

A disconnection time acquisition system according to one aspect of the disclosure includes an electronic device and a network server. The disconnection time acquisition system includes a response requesting circuit, a response determining circuit, a response circuit, a time storage circuit, and a time management circuit. The response requesting circuit, located in the network server, transmits a response request signal to the electronic device as a transmission destination. The response determining circuit, located in the network server, determines whether or not a response signal in response to the response request signal is received. The response circuit, located in the electronic device, replies the response signal in response to the response request signal to the network server. The time storage circuit, located in the network server, stores a time without the response signal when the response signal in response to the response request signal is not received. The time management circuit manages the time without response signal as a disconnection time at which a power supply of the electronic device is disconnected when the power supply of the electronic device is turned on.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

BRIEF DESCRIPTION OF THE DRAWINGS

FIG. 5B illustrates an exemplary time management of the image processing apparatus including the image processing system according to the one embodiment when the power is turned on.

DETAILED DESCRIPTION

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes embodiments of a disconnection time acquisition system and a disconnection time acquisition method of the disclosure for ease of understanding the disclosure, with reference to the attached drawings. The following embodiments are merely an exemplary embodiment according to the disclosure and not intended to limit the technical scope of the disclosure. Additionally, the letter "S" attached before a numeral in the flowchart means a step.

The following describes an image processing system, which includes an image processing apparatus as an electronic device and a network server, as one example of a disconnection time acquisition system according to the embodiment of the disclosure. The image processing apparatus of the disclosure includes a multi-functional peripheral (MFP) having functions such as a facsimile, a copier, a scanner, and a printer.

Figure 1:
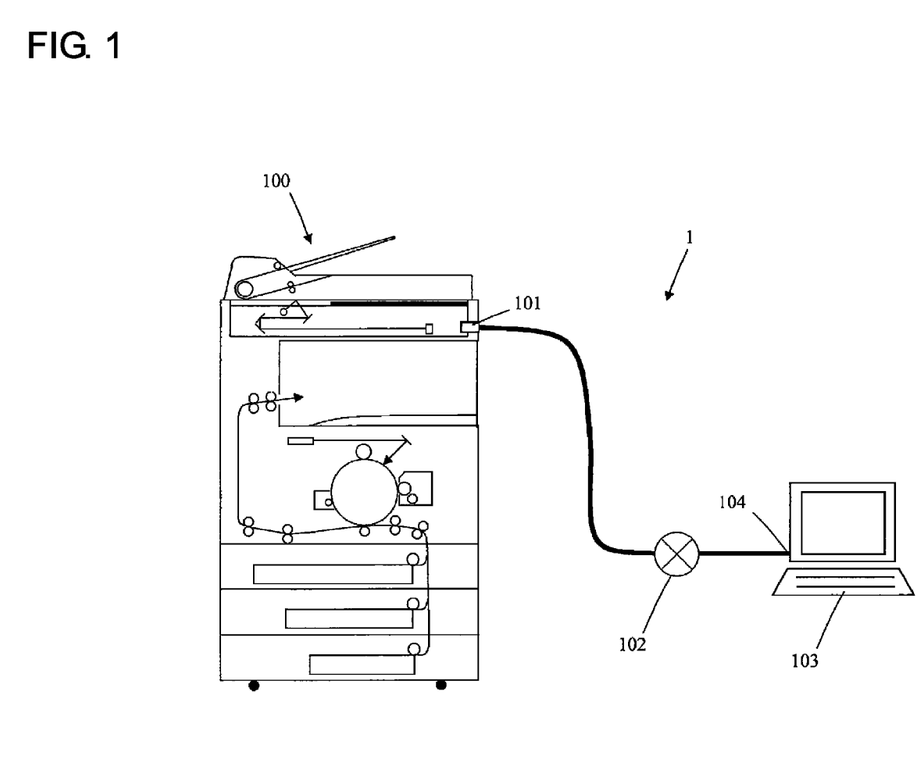
FIG. 1 conceptually illustrates an overall configuration of an image processing system according to one embodiment of the disclosure.

When an image processing apparatus 100 of an image processing system 1, as illustrated in FIG. 1, accepts a job regarding an original document via an operation unit including a touch panel from a user, the image processing apparatus 100 drives respective units such as an image reading control unit and an image formation control unit to execute this job. The image processing apparatus 100, which further includes a first network communication unit 101, is communicatively connected to a network server 103 via a network 102. The network server 103, which includes a second network communication unit 104, transmits a specific packet to the image processing apparatus 100, and this image processing apparatus 100 replies a response to the received specific packet to the network server 103. The network server 103 manages the packet and stores a virtual the disconnection time corresponding to existence of any response to the packet. The image processing apparatus 100 acquires the disconnection time from the network server 103 to store when a main power supply switch of the image processing apparatus 100 is turned on again after disconnection of the main power supply switch of the image processing apparatus 100.

The image processing apparatus 100 and the network server 103 include control circuits (not illustrated) connect to a central processing unit (CPU), a read only memory (ROM), a random access memory (RAM), a hard disk drive (HDD), a solid state drive (SSD), and drivers corresponding to respective driving units via an internal bus. The CPU, for example, uses the RAM as a work area to execute programs stored in the ROM, the HDD, the SSD, or similar device. The CPU transmits and receives, for example, data, an instruction, a signal, and a command from the drivers based on this execution result to control operations of the respective driving units regarding execution of various processes. In regards to respective units described later (illustrated in FIG. 2) other than the driving units, the CPU also ensures these respective units by executing respective programs. The ROM, the RAM, the HDD, the SSD, and similar device store the programs and data that ensure the respective units described the following.

Figure 2:
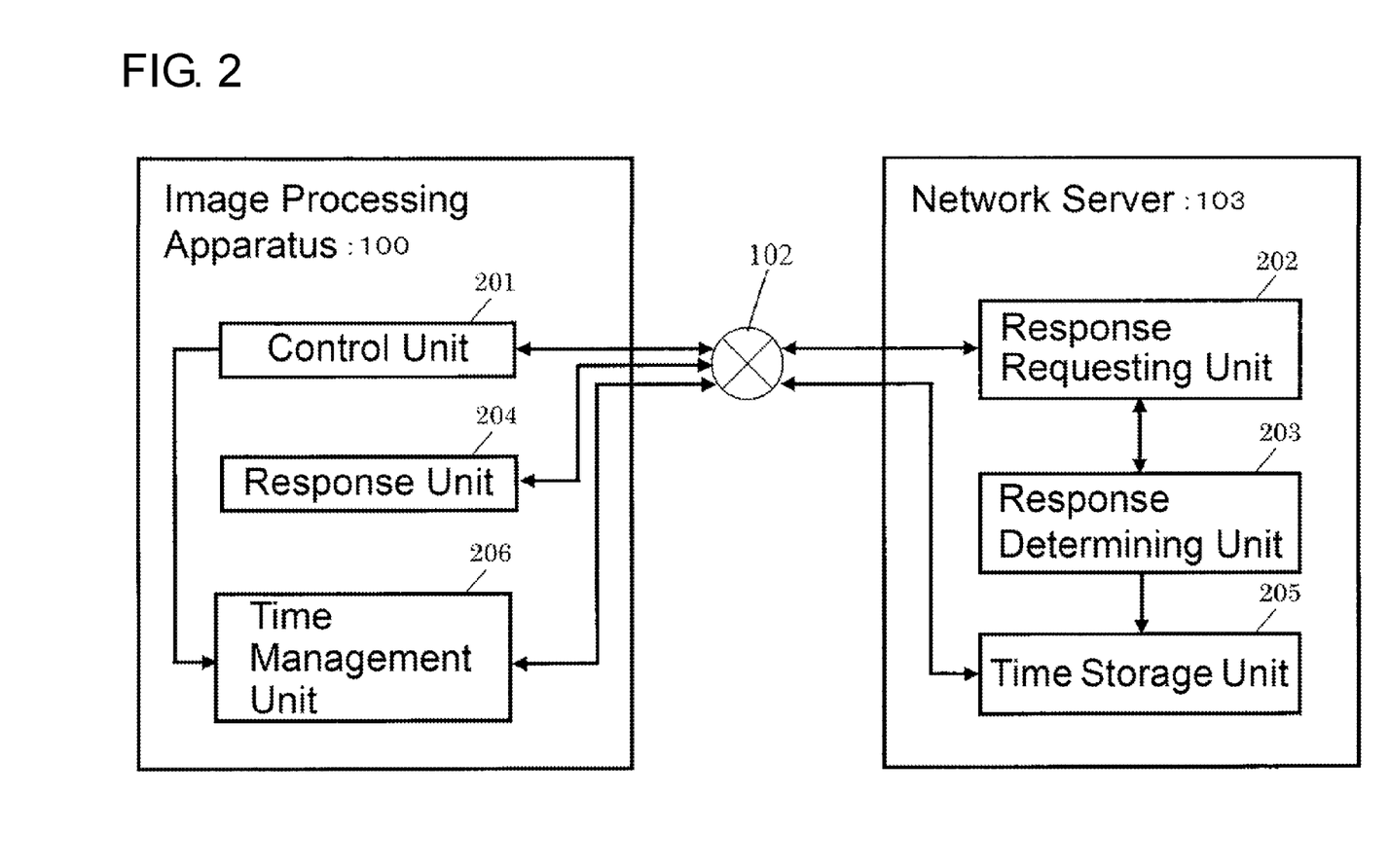
FIG. 2 illustrates the image processing system according to the one embodiment.
Figure 3:
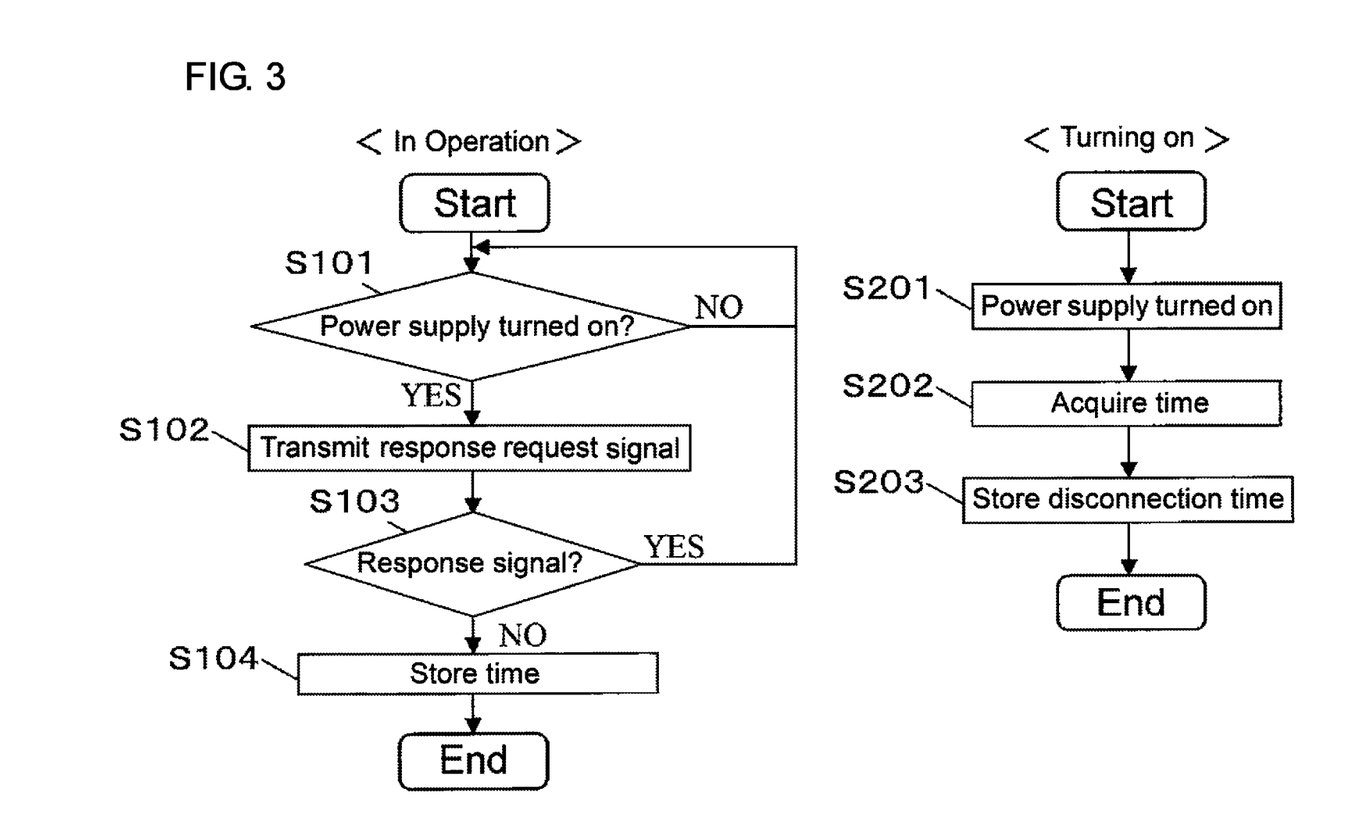
FIG. 3 illustrates an execution procedure according to the one embodiment.

Next, with reference to FIGS. 2 and 3, the following describes a configuration and an execution procedure according to the embodiment of the disclosure. First, assume that both the image processing apparatus 100 and the network server 103 of the image processing system 1 are in operation. For example, the image processing apparatus 100 includes the main power supply switch using an AC switch, and turning off this main power supply switch by the user disconnects a power supply of the image processing apparatus 100.

Here, while the main power supply switch is in ON state and the power supply of the image processing apparatus 100 is turned on (FIG. 3: YES at S101), a control unit 201 in this image processing apparatus 100 accepts input of a job from the user via the operation unit and controls the respective units such as the image reading control unit and the image formation control unit to execute this job.

The image processing apparatus 100 is communicatively connected to the network server 103 via the network 102. The network server 103 includes a response requesting unit 202 (also referred to as a response requesting circuit) that transmits a response request signal to the image processing apparatus 100, which is connected to the network 102, as a transmission destination at the specific time point during an operation of the network server 103 (FIG. 3: S102).

Here, for example, the response request signal may be a ping request signal to confirm that the image processing apparatus 100 and the network server 103 are communicatively connected. The response requesting unit 202 issues a ping command to transmit a ping request signal to the image processing apparatus 100 via the second network communication unit 104 as illustrated in FIG. 4A.

After the response requesting unit 202 transmits the ping request signal, the response requesting unit 202 notifies a response determining unit 203 (also referred to as a response determining circuit) of its fact. The response determining unit 203, which has received this notification, determines whether or not a response signal in response to the response request signal is received (FIG. 3: S103).

Here, the response determining unit 203 measures an elapsed time from the time point at which the response request signal is transmitted using, for example, a preliminarily located specific timer to determine whether or not this measured elapsed time exceeds a predetermined threshold period. The threshold period is, for example, a specific period including a period required for network communications. Specifically, the period is, for example, one minute or several minutes.

Figure 4A:
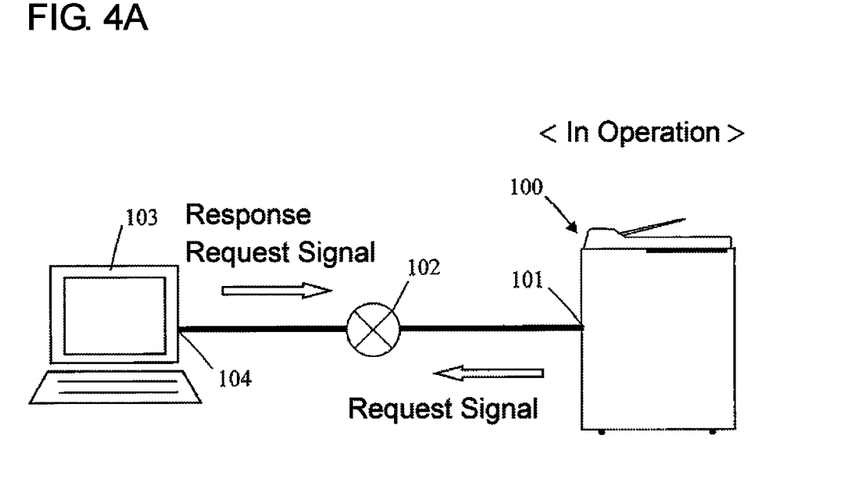
FIG. 4A illustrates an exemplary signal exchange of an operating image processing apparatus including the image processing system according to the one embodiment.

Here, as illustrated in FIG. 4A, while the image processing apparatus 100 is in operation, this image processing apparatus 100 receives a response request signal via the first network communication unit 101. After that, this image processing apparatus 100 includes a response unit 204 (also referred to as a response circuit) that replies a response signal in response to the response request signal to the network server 103.

Then, the response requesting unit 202 in the network server 103 receives the response signal from the image processing apparatus 100 and then notifies the response determining unit 203 of its fact. The response determining unit 203, which has received this notification, determines that the response signal in response to the response request signal is received when receiving the response signal before the elapsed time exceeds the threshold period (FIG. 3: YES at S103). This ensures confirming that the main power supply switch of the image processing apparatus 100 is in ON state.

Here, return to S101, while the power supply of the image processing apparatus 100 is turned on (FIG. 3: YES at S101), the response determining unit 203 notifies the response requesting unit 202 of its fact. The response requesting unit 202, which has received this notification, transmits the response request signal to the image processing apparatus 100 as the transmission destination at the specific time point again (FIG. 3: S102). Then, the response unit 204 in the image processing apparatus 100 replies the response signal in response to the response request signal to the network server 103, and the response determining unit 203 determines that the response signal in response to the response request signal is received (FIG. 3: YES at S103).

Thus, insofar as the main power supply switch of the image processing apparatus 100 is in ON state, the response requesting unit 202 repeats transmission of the response request signal. This consequently causes the network server 103 to monitor the state where the power supply of image processing apparatus 100 is turned on. This repeated transmission of the response request signal is periodically executed. This cycle is, for example, a specific period including a period required for network communications. Specifically, the period is, for example, one minute or several minutes.

Figure 4B:
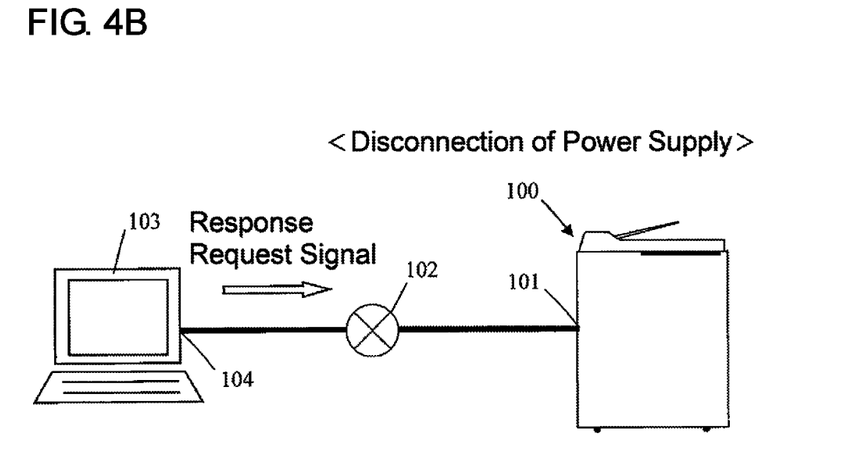
FIG. 4B illustrates an exemplary signal exchange of the image processing apparatus including the image processing system according to the one embodiment when the power-supply is disconnected.

Here, when the user turns off the main power supply switch, or a blackout occurs in S101, the power supply of the image processing apparatus 100 is consequently set to a disconnection state (FIG. 3: NO at S101). In this state, transmitting the response request signal to the image processing apparatus 100 as the transmission destination by the response requesting unit 202 (FIG. 3: S102) causes the response unit 204 to become inoperative in the image processing apparatus 100. Thus, the response signal is not replied to the network server 103 as illustrated in FIG. 4B. Then, when the elapsed time exceeds the threshold period and, the response signal is not received, the response determining unit 203 determines that the response signal in response to the response request signal is not received (FIG. 3: NO at S103). Additionally, the same applies to the case where the network server 103 does not successfully receive the response signal due to any cause such as a network communication error.

Figure 5A:
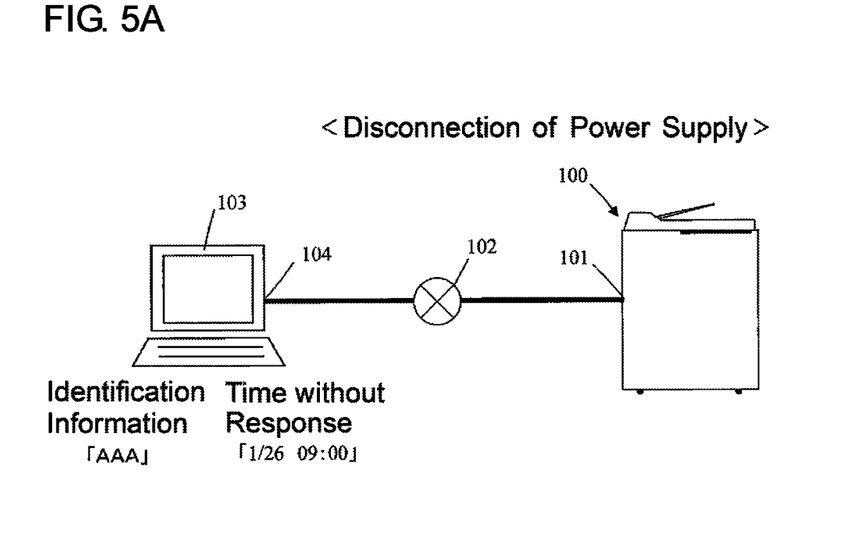
FIG. 5A illustrates an exemplary time storage of the image processing apparatus including the image processing system according to the one embodiment when the power-supply is disconnected.

When the response determining unit 203 determines that the response signal in response to the response request signal is not received (FIG. 3: NO at S103), the response determining unit 203 notifies a time storage unit 205 (also referred to as a time storage circuit) of its fact. Then, the time storage unit 205, which has received this notification, stores a time without the response signal (FIG. 3: S104). For example, the time storage unit 205 acquires the time (January 26th, 9:00) at which this notification is received from the response determining unit 203 from a preliminarily located real-time clock, so as to store this acquired time associated with identification information on the image processing apparatus 100 (such as a MAC address and an IP address, for example, "AAA") in a specific memory as illustrated in FIG. 5A. While it is preferred that the time include a date, the time may be a time alone. Even if the power supply of the image processing apparatus 100 is disconnected, this causes the network server 103 to monitor the state where the power supply of the image processing apparatus 100 is turned on, thus ensuring the specific memory to store the time.

Then, when the user sets the main power supply switch of this image processing apparatus 100 to ON state in the state where the power supply of the image processing apparatus 100 is disconnected, the power supply of this image processing apparatus 100 is turned on (FIG. 3: S201). After that, the control unit 201 in the image processing apparatus 100 executes an initial operation and notifies a time management unit 206 (also referred to as a time management circuit) of a fact of turning on the power supply. The time management unit 206, which has received this notification, manages the time without response signal stored in the network server 103 as a disconnection time at which the power supply of the image processing apparatus 100 is disconnected.

Figure 5B:
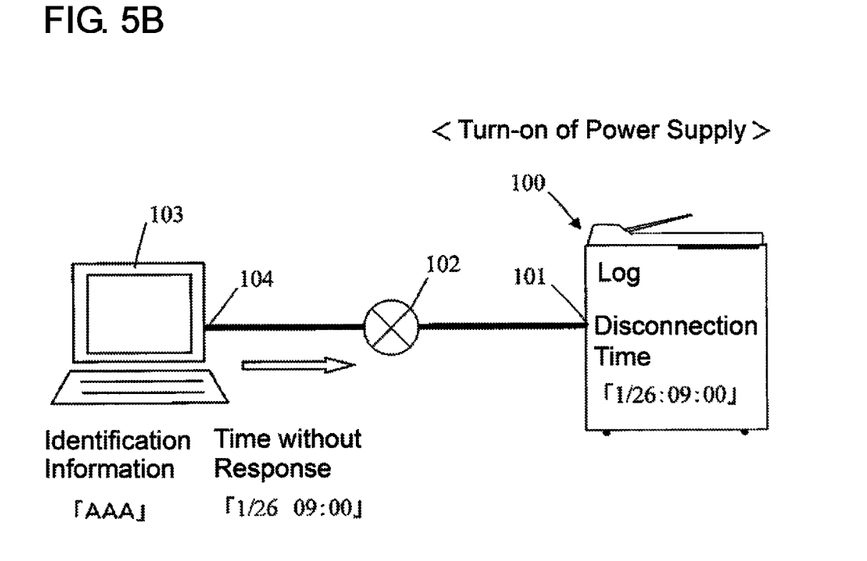

For example, as illustrated in FIG. 5B, the time management unit 206 communicates with the network server 103 and acquires the time (January 26th, 9:00) associated with the identification information on the image processing apparatus 100 ("AAA") among times stored in this network server 103 (FIG. 3: S202). Next, the time management unit 206 causes a memory for a log to store the acquired time (January 26th, 9:00) as the disconnection time (FIG. 3: S203). This enables the disconnection time of the image processing apparatus 100 to be logged. Here, a configuration of the disclosure acquires the disconnection time of the image processing apparatus 100 from the network server 103 outside and does not use any member in the image processing apparatus 100 for the acquisition. This eliminates the need for the image processing apparatus 100 to includes any exclusive component such as a battery. This ensures cost reduction. It is not necessary for the image processing apparatus 100 to be specified for a low voltage power supply or to include another system that detects a start of a shutting down a power supply so as to exclusively acquire a disconnection time. This ensures cost reduction.

While the embodiment of the disclosure is applied to an image processing system including an image processing apparatus, it is possible to employ a typical electronic device (such as a terminal device) instead of the image processing apparatus so as to apply the embodiment of the disclosure to a disconnection time acquisition system including an electronic device and a network server. This also achieves similar operations and effects.

Figure 6A:
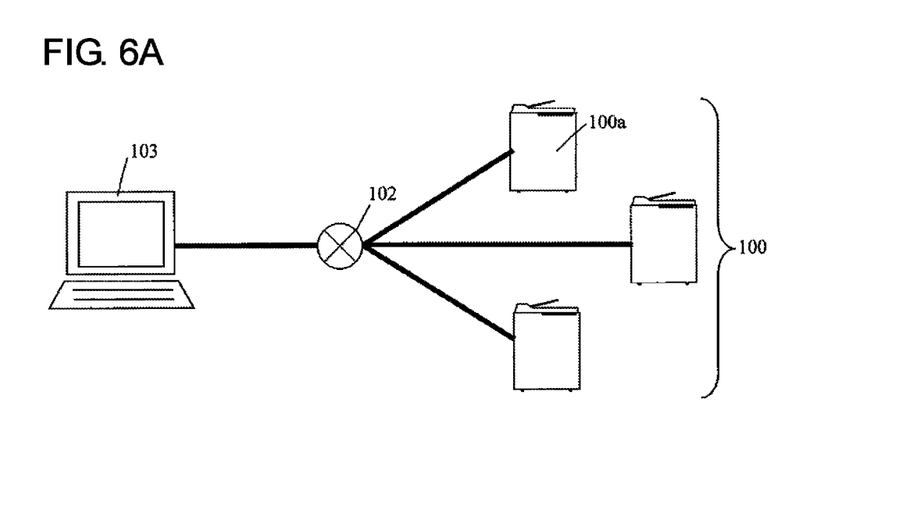
FIG. 6A conceptually illustrates a plurality of electronic devices as an image processing system according to another embodiment are connected to a network server.
Figure 6B:
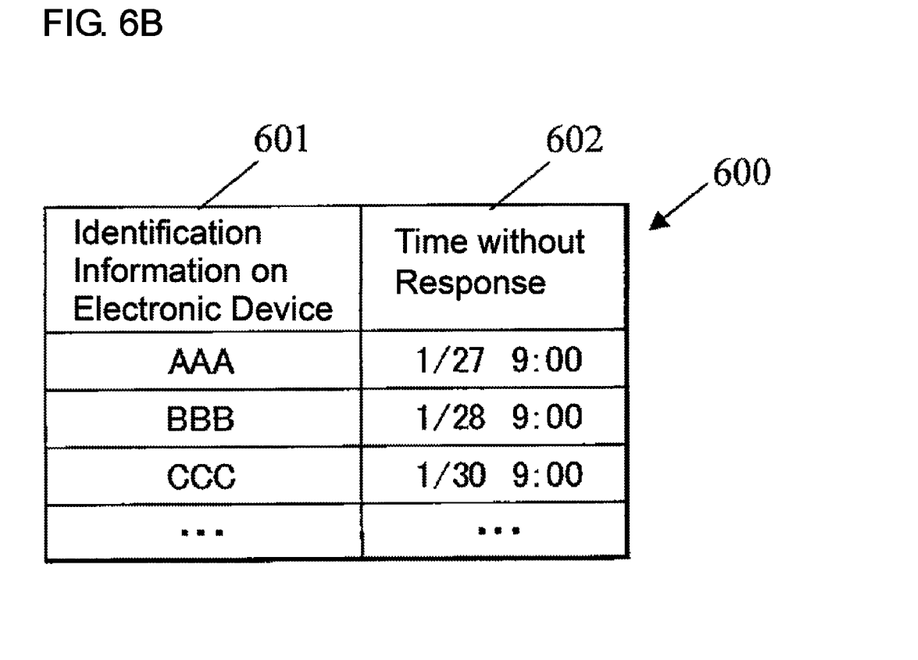
FIG. 6B illustrates an exemplary time management table of the image processing system according to the other embodiment.

While in the embodiment of the disclosure one electronic device 100 (the image processing apparatus 100 is an exemplary electronic device 100) is connected to a network server 103, a plurality of electronic devices 100 connected to the network server 103 also achieve the similar operations and effects. For example, when a plurality of the electronic devices 100 are connected to the network server 103 as illustrated in FIG. 6A, a response requesting unit 202 transmits the response request signal to the respective electronic devices 100 based on identification information on the electronic devices 100. Then, a response determining unit 203 determines whether or not the response signal is received from the respective electronic devices 100 based on the identification information on the electronic devices 100. Here, when the response determining unit 203 determines that the response signal from a first electronic device 100a is not received, a time storage unit 205 refers to a time management table 600 stored in a specific memory. The time management table 600 associates and stores identification information 601 on the electronic devices 100 connected to the network server 103 with a time without the response signal 602 from these electronic devices 100 as illustrated in FIG. 6B. When the response signal from the first electronic device 100a is not received, the time storage unit 205 collates identification information (for example, "AAA") on this first electronic device 100a with the identification information 601 on the electronic devices 100 stored in the time management table 600, so as to associate this collated identification information 601 on the first electronic device 100a with a time without the response signal 602 (January 27th, 9:00) and store. Then, when a power supply of the first electronic device 100a is turned on, a time management unit 206 in this first electronic device 100a refers to the time management table 600 in the network server 103 to collate identification information ("AAA") on the first electronic device 100a with the identification information 601 on the electronic devices 100 stored in the time management table 600, so as to acquire the time without response signal 602 associated with this collated identification information 601 on the first electronic device 100a. Then, the time management unit 206 manages the acquired time without the response signal 602 as the disconnection time at which the power supply of the first electronic device 100a is disconnected. As described above, managing a disconnection time of a plurality of the electronic devices 100 by one network server 103 ensures that a disconnection time at which a power supply is disconnected is logged with certainty and ensures cost reduction.

While in the embodiment of the disclosure the time management unit 206 is configured to acquire the time without response signal from the network server 103 after the power supply is turned on, another configuration may be employed. For example, the embodiment of the disclosure may be configured such that when the time storage unit 205 detects a turn-on of the power supply of the electronic device 100 after disconnection of the power supply, the time storage unit 205 in the network server 103 transmits the time without response signal associated with this detected electronic device 100 to this electronic device 100, and then the time management unit 206 in this electronic device 100 manages the received time without the response signal as the disconnection time.

While in the embodiment of the disclosure the electronic device in the disconnection time acquisition system and the network server include the respective units, it is also possible to configured to include a storage medium storing programs to achieve these respective units and provide this storage medium. This configuration causes the electronic device and the network server to read the programs, and then the electronic device and the network server achieve the respective units. In this case, the programs itself read from the recording medium achieves the operations and effects of the disclosure, and the disclosure further ensures providing as a method for causing a hard disk to store the steps executed by the respective units.

As described above, the disconnection time acquisition system, the image processing system, and the disconnection time acquisition method according to the disclosure are useful for a disconnection time acquisition system that includes an electronic device such as an image processing apparatus such as a multi-functional peripheral and a copier, ensure a log of a disconnection time at which a power supply is disconnected with certainty, and are effective as a disconnection time acquisition system, an image processing system, and a disconnection time acquisition method that avoids an increased high cost.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A disconnection time acquisition system including an electronic device and a network server, comprising:
   a response requesting circuit, located in the network server, that transmits a response request signal to the electronic device as a transmission destination;
   a response determining circuit, located in the network server, that determines whether or not a response signal in response to the response request signal is received;
   a response circuit, located in the electronic device, that replies the response signal in response to the response request signal to the network server;
   a time storage circuit, located in the network server, that stores a time without the response signal when the response signal in response to the response request signal is not received; and
   a time management circuit that manages the time without response signal as a disconnection time at which a power supply of the electronic device is disconnected when the power supply of the electronic device is turned on; wherein
   the response determining circuit measures an elapsed time from a time point at which the response request signal is transmitted and determines whether or not the measured elapsed time exceeds a predetermined threshold period, so as to determine that the response signal in response to the response request signal is not received if the response signal is not received when the elapsed time exceeds the threshold period.

2. The disconnection time acquisition system according to claim 1, wherein:
   a plurality of electronic devices are connected to the network server;
   the time storage circuit associates and stores the time without the response signal with identification information on the electronic device; and
   the time management circuit manages the time without the response signal associated with the identification information on the electronic device as the disconnection time.

3. An image processing system including an image processing apparatus and a network server, comprising:
   a response requesting circuit, located in the network server, that transmits a response request signal to the image processing apparatus as a transmission destination;
   a response determining circuit, located in the network server, that determines whether or not a response signal in response to the response request signal is received;
   a response circuit, located in the image processing apparatus, that replies the response signal in response to the response request signal to the network server;
   a time storage circuit, located in the network server, that stores a time without the response signal when the response signal in response to the response request signal is not received; and
   a time management circuit that manages the time without the response signal as a disconnection time at which a power supply of the image processing apparatus is disconnected when the power supply of the image processing apparatus is turned on; wherein
   the response determining circuit measures an elapsed time from a time point at which the response request signal is transmitted and determines whether or not the measured elapsed time exceeds a predetermined threshold period, so as to determine that the response signal in response to the response request signal is not received if the response signal is not received when the elapsed time exceeds the threshold period.

4. A disconnection time acquisition method of a disconnection time acquisition system including an electronic device and a network server, comprising:
   transmitting, in the network server, a response request signal to the electronic device as a transmission destination;
   determining, in the network server, whether or not a response signal in response to the response request signal is received;
   replying, in the electronic device, the response signal in response to the response request signal to the network server;
   storing, in the network server, a time without the response signal when the response signal in response to the response request signal is not received; and
   managing the time without the response signal as a disconnection time at which a power supply of the electronic device is disconnected when the power supply of the electronic device is turned on; and
   in the network server, measuring an elapsed time from a time point at which the response request signal is transmitted, and determining whether or not the measured elapsed time exceeds a predetermined threshold period, so as to determine that the response signal in response to the response request signal is not received if the response signal is not received when the elapsed time exceeds the threshold period.

* * * * *